Figure 1:
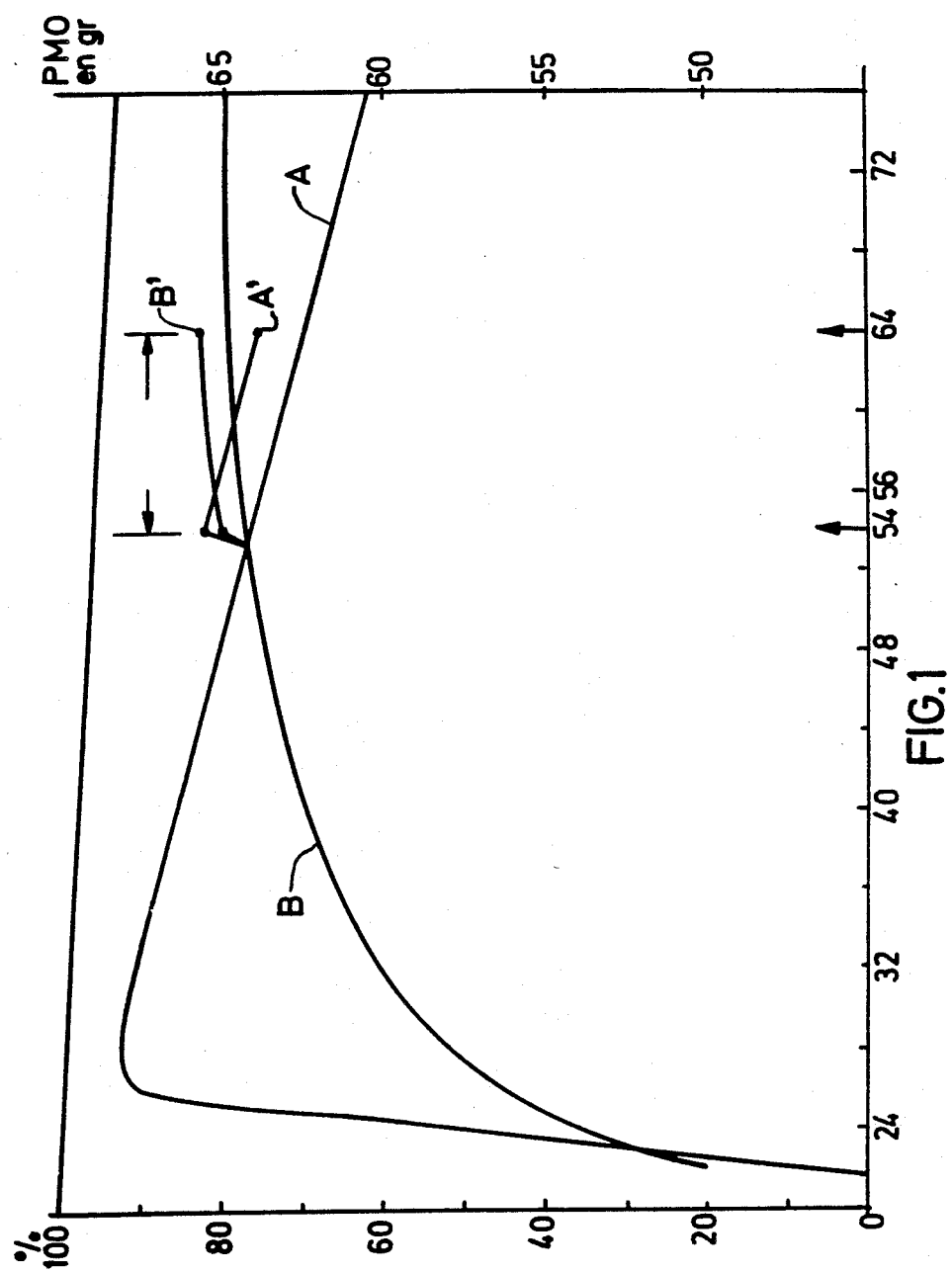

United States Patent [19]
Dubois et al.

[11] Patent Number: 4,851,242
[45] Date of Patent: Jul. 25, 1989

[54] NUTRITIONAL PRODUCT, ESPECIALLY FOR ANIMALS AND SOILS, AND PROCESS FOR THE MANUFACTURE THEREOF

[75] Inventors: Pierre G. Dubois, Larmor-Plage; François M. Lognone, Saint Malo; François J. Pape, Le Folgoet, all of France

[73] Assignee: Calcialiment, Pleudihen, France

[21] Appl. No.: 14,232

[22] Filed: Feb. 12, 1987

Related U.S. Application Data

[63] Continuation of Ser. No. 711,562, Feb. 8, 1985, abandoned.

[51] Int. Cl.$^4$ .................................................. A23K 1/10
[52] U.S. Cl. ......................................... 426/74; 71/15; 71/34; 426/635
[58] Field of Search ................ 426/74, 648, 807, 635; 71/15, 34

[56] References Cited

U.S. PATENT DOCUMENTS

| | | | |
|---|---|---|---|
| 3,370,954 | 2/1968 | Kuster | 426/648 |
| 3,403,972 | 10/1968 | Harnisch | 426/648 |
| 3,425,837 | 2/1969 | Conte | 426/648 |

FOREIGN PATENT DOCUMENTS

| | | | |
|---|---|---|---|
| 204738 | 2/1955 | Australia | 426/74 |
| 2854817 | 12/1979 | Fed. Rep. of Germany | |
| 5473138 | 6/1979 | Japan | |

OTHER PUBLICATIONS

Chemical Abstracts 74:10875f page 122, 1971.
Chemical Abstracts 46:2248a.

*Primary Examiner*—Donald E. Czaja
*Assistant Examiner*—Carolyn Paden
*Attorney, Agent, or Firm*—William R. Hinds

[57] ABSTRACT

A nutritional product for animals and for soils consists of aggregates of organic sea limestones of recent formation, part of which takes the form of at least one of the mono-, di- and tri-calcium phosphates resulting from the action of phosphoric acid on the limestones, the product containing a maximum of 20% phosphorus by weight. The manufacturing process involves reacting phosphoric acid with the limestones in the presence of water, at least part of which is sea water, to form the phosphate around the shell core, and extracting under reduced pressure the noxious gaseous products resulting from this reaction.

21 Claims, 3 Drawing Sheets

NUTRITIONAL PRODUCT, ESPECIALLY FOR ANIMALS AND SOILS, AND PROCESS FOR THE MANUFACTURE THEREOF

This is a continuation of application Ser. No. 711,562 filed Feb 8, 1985, now abandoned.

The invention relates to a nutritional product, as well as to a process and an installation for manufacture thereof, and to the corresponding foodstuff composition.

It is applied in particular, preferably but without limitation, to the testing of breeding animals (laying hens, cattle, sheep, pigs, goats, and the like), and for solids as fertilizer.

It is known that calcium and phosphorus are the two most essential elements for animal and plant life.

As regards calcium, it is present in all organisms and in the various kinds of animal produce (eggs, milk, meats). It therefore has to be supplied to animals by the alimentary route, in sufficient quantity, for the same reason as the other feeding constituents, in order to avoid serious deficiency states.

For example, it has been established that, to produce the binding of 1.2 gram of calcium per liter of milk, dairy cows must be made to absorb 3 to 4 grams of calcium; for pigs, each kilogram of live weight gained during growth requires the assimilation of approximately 20 grams of calcium; for laying hens, it is estimated that 28% by weight of the dry matter of the egg consists of calcium carbonate and that, to lay 200 eggs per year, a hen has to assimilate 15 to 16 times its body content of calcium during this period.

However, calcium also participates in various vital animal processes, especially as a constituent of the skeleton and bones, but also in the regulation of cardiac and muscular excitability, in blood coagulation, in the regulation of cell permeability, in its general sedative and calmative action, and in its general anti-infectious action in combating certain diseases.

It is also known that phosphorus plays an essential role in vertebrates, being present with calcium in the form of tricalcium phosphate $Ca_3(PO_4)_2$ in the bones, participating in the composition of the most important enzymes in the organism, and being chemically associated with the main nucleic acid, plasma lipid and nerve cell fractions.

Calcium deficiency causes significant disturbances of neuromuscular function, and decalcification. For the producing animal, when it is insufficiently fed with calcium, the calcium composition of its produce—eggs, milk and meat—remains more or less constant for an initial period, and then, in its turn, suffers from this deficiency.

As regards phosphate deficiency, this in general leads chemically to chronic debility.

On the basis of these observations, foodstuff formulae have been developed for animals, comprising calcium-rich compounds, such as calcium carbonate, combined with calcium phosphates obtained from bone powders or defluorinated phosphates.

This animal feeding technique possesses a 2-fold advantage: by supplying not only phosphorus but also calcium, calcium phosphate enables the phosphorus/calcium ratio to be improved without the need to make use of mineral supplements only containing calcium. Now, whereas the latter additional supply of calcium, in particular from sea shells, as carried out in any poultry-run, remains valid for this type of holding, the same cannot apply in industrial stock-farms, to the extent that it is impossible to provide an auxiliary feeding line, exclusively for calcium, in which the animals would instinctively feed "on demand" to compensate a possible calcium deficiency, beside the main feeding line; in this connection, it is necessary to known that the smallest industrial laying-hen farm contains of the order of 15,000 birds. Furthermore, it is known that, whereas the use of calcium phosphate by itself sometimes enables the desired percentage of calcium to be attained in the compounded feed (particular case of growing chickens), in contrast, when the produce envisaged removes substantial quantities of calcium from the organism (case of egg laying and lactation), calcium phosphate by itself cannot then satisfy the calcium requirements without raising dangerously the overall content of highly assimilable inorganic phosphorus in the feed ration.

Now, whereas deficiencies, especially of calcium, are dangerous, excesses are still more dangerous, especially excess of phosphorus, since they bring about other types of deficiency.

To prevent all these problems, there have therefore been developed feed formulae, mentioned above, in which, so that the phosphorus/calcium ratio is satisfactory, the calcium is provided from two compounds:
calcium carbonate,
calcium phosphate, and especially bicalcium phosphate.

In these formulae, the calcium carbonate is supplied either in inorganic form (ground chalk or fossil sea shells, especially oyster shells), or in organic form (sea shells of recent formation).

Among the most conventional formulae for breeding laying hens, there may be mentioned:

| FORMULA A | |
|---|---|
| Calcium carbonate | 7.45 |
| Bicalcium phosphate | 1.43 |
| Trace vitamin complex (TVC) | 1.00 |
| Soya containing 48% protein | 19.49 |
| Corn | 56.34 |
| Wheat | 14.21 |
| Methionine | 0.08 |
| FORMULA B | |
| Calcium carbonate | 7.14 |
| Bicalcium phosphate | 0.68 |
| Meat on the bone, containing 55% protein | 4.00 |
| TVC | 1.00 |
| Soya containing 48% protein | 15.31 |
| Corn | 46.07 |
| Wheat | 25.72 |
| Methionine | 0.08 | in which the values of the components denote percentages by weight.

Practice and experiment have shown that these formulae give satisfactory results as regards the calcium, phosphorus and protein supply, and as regards the partiality shown by animals for them.

Formula B, based on meat on the bone, supplies the calcium and phosphorus complements which distinguish it from Formula A.

For soil nutrition, it is also known to practice the occasional distribution of lime- or lime/magnesium-containing conditioners, in the crude extracted state, burnt or simply ground, the conditioners being supplemented by regular supplies of phosphate fertilizers.

However, no alkaline soil, and in particular no lime soil, admits the supply of conditioners containing sea products, since the latter are themselves alkaline.

Soil nutrition on the basis of sea products is hence, at the present time, only possible in respect of acid or neutral soils.

This nutrition of soils, like that of animals, on the basis of calcium carbonates combined with, among other things, calcium phosphates is being used increasingly, when the carbonates come from sea shells, on the basis of recently formed shells rather than fossile shells which have lost all of their original organic material and have thereby become purely inorganic materials.

In fact, shells of recent formation always contain proteins, which increases their biological value.

Moreover, when poultry have the possibility of choosing between feeds of different origins, they always show a partiality for feeds containing sea shells of the most recent formation.

Administration of these feeds must then make some precautions necessary, since an excessively alkaline intestinal medium discourages the maintenance of the phosphates and carbonates in a soluble form, and they will tend to precipitate. Hence, any excessive supply of the abovementioned carbonates, which would give rise to the estalishment of an excessively basic medium, can modify foodstuff metabolism in a unfavorable manner.

Now it is a fact that the principal condition for maintaining good assimilation of food is that it should retain high solubility while in the intestine.

The invention aims in particular, to prevent these disadvantages by providing a substitute nutritional product based on calcareous sea products of recent formation, which on the one hand enables calcium and phosphorus supplies and also a satisfactory phosphorus/calcium ratio to be assured, while on the other hand showing remarkable assimilation in the intestinal medium as a result of maximal use of the gastric juice and high activation of the intestinal flora. To this end, the nutritional product according to the invention consists of aggregates of organic sea limestones of recent formation, particularly shells and especially of oysters, or lithothamnioid algae, part of which takes the form of at least one of the mono-, bi and tricalcium phosphates resulting from the action of phosphoric acid on the said sea limestones.

In the abovementioned formulae, the nutritional product according to the invention, drawn from the ocean depths, substantially substitutes for the calcium carbonates and calcium phosphates, leading to a first sure advantage from the economic standpoint.

Since only part of the organic sea limestone is converted to at least one calcium phosphate, the product retains a substantial fraction of its other useful constituents, (sulfur, magnesium, trace elements, growth hormones, and the like).

The product according to the invention hence enables the use of organic seal limestone natural products, lithothamnioid algae and oyster sheels of recent formation to be very broadly developed.

The product according to the invention contains a maximum of 20% of phosphorus by weight; for feeding laying hens, the phosphorus content is from 1% to 3% by weight, and preferably approximately 2.6%; for feeding livestock, the phosphorus content is from 3% to 105 by weight, and approximately 7% for cattle and approximately 9% for pigs; for soil nutrition, the phosphorus content is from 1% to 20% by weight, and preferably approximately 5% to 10%.

The product according to the invention is made in such a way that it contains a mixture of approximately 55% of bicalcium phosphate, 35% of monocalcium phosphate and 10% of tricalcium phosphate.

These three phosphate compounds complement each other since:

the value of monocalcium phosphate is two-fold: it is readily soluble in all media, water and gastric juice; as a result of its acidifying nature, it prevents the pH of the intestinal medium, which is always loaded with proteins which tend to make it alkaline, from rising excessively;

bicalcium phosphate, which is insoluble in water but which remains soluble in gastric juice, is only slightly acidifying; it is hence unsuitable for acidifying the medium to the extend accomplished by monocalcium phosphate; on the other hand, it is a coherent compound which possesses a large amount of calcium; it hence constitutes an important vehicle for calcium, a passive product;

if present in a minority, as is the case according to the present invention, tricalcium phosphate is of great value since it is the phosphate product which will pass through the longest pathway in the digestive tract: it will be the great activator for the intestinal flora, and is finally absorbed in the form of organic compounds.

In its use for animal feeding, the product according to the invention is hence very highly digestible, which provides for a reduction in the mass of calcium supplied in favor of the quality of metabolism of cereals and supplementary proteins.

In its application to soil nutrition, it is also accepted by alkaline soils, for example lime soils, and this offers an additional outlet for the abovementioned type of calcareous algae and organic sea shells.

The product according to the invention is presented, for use, with a degree of moisture of approximately 3% for animal feeding, and approximately 7% for soil treatment; preferably, this moisture is obtained with sea water; as regards the particle size, this can be approximately 2 mm to 4 mm for animal feeding, and 0.5 mm to 3 mm for soil treatment.

The process according to the invention for producing the product will now be described.

Sea limestones, broken up to a greater or lesser extent by surges of the sea, are crushed and screened to have an optimal particle size of 0.5 mm to 4 mm. The upper limiting value makes subsequent absorption of the finished product very easy; the lower limiting value avoids the presence of excessively fine particles, which are known to be those most liable subsequently, during phosphatation, to produce tricalcium phosphate. The aggregates are then dried to remove shell sand in a dust-like state, for example by means of cyclone.

The aggregates are then agitated under vacuum, preferably in the presence of sea water, and subjected to the action of phosphoric acid at a temperature between 30° C. and 100° C. Due to the physical structure of the sea limestone (shell and/or lithothamnioid algae) forming each aggregate, microcracking and/or twisted fringes or loops arise at the surface of the aggregate, and these, on the one hand promote intimate contact over a large area with the gastric juice, and on the other hand reduce the risk of the aggregate adhering to the digestive walls. The gastric juice is thus used to the best advantage, since complete and gradual attack of the treated aggregate takes place during its progress through the small intestine.

As a result of being covered with a layer of gelatin, the smooth face of an oyster shell offers greater resistance to the action of the acid than the rough face of the shell; this differential chemical action combined with the mechanical action of the movement of the rotor which acts as chemical reactor, will cause twisting of the shell aggregates. The stresses generated by this twisting will, moreover, bring about the formation of microcracks on the convex faces of the aggregates. Since the algae are rough by nature, and the shell aggregates are distorted by phosphoric acid attack, the result is that neither one nor the other of these have any flat surface: they cannot become stuck to the digestive tract. Furthermore, they will be maintained consistently dispersed in the digestive system, which results in their great efficacy throughout digestion. Limitation of the attack by acid to the surface of the shell and algal aggregates, for surface formation of at least one of the mono-, bi- and tricalcium phosphates, enables the central core of organo-inorganic material to remain intact, and to retain all its original properties and constituents.

The gradual disintegration of the final product obtained according to the invention permits extended release of calcium++ ions throughout the entire length of the small intestine. There is hence no risk here of violent neutralization of the gastric juices, and of interfering with the acid attack of foodstuffs and therefore interfering with the whole digestive process.

According to a first example of implementation, to produce a feed product for laying hens, which had to contain 2.6% of phophorus and 32% of calcium by weight with 3% of moisture, 1.063 g of shell aggregates containing 13% of moisture were treated with 110 g of industrial phosphoric acid at a concentration fo 75%.

According to a second example, to produce a feed product for cattle and pigs which had to contain 9% of phosphorus and 32% of calcium by weight with 3% of moisture, 1,360 g of shell aggregates containing 17% of moisture were treated with 640 g o industrial phosphoric acid at a concentration of 75%.

A side effect of the reaction from a biological standpoint is the complete destruction of salmonellae, which are numerous in shell fish.

The effect of the vacuum permits the removal of excess fluorinated compounds, and the expulsion of carbon dioxide and steam which result from the reaction and its exothermic nature.

At the end of the reaction, the treated aggregates are dried to the desired degree of moisture stated above.

FIG. 1 shows the results of trials carried out on laying hens between their 54th and 65th weeks of life. Curve A shows the average laying frequency and curve B shows the average weight of the eggs for a batch of hens fed conventionally. Curves A' and B' show the same factors for a batch of 1,500 identical hens fed with the product according to the invention. With the product according to the invention, the laying frequency increased by 5% and the average weight of the eggs increased by 1.5 g.

Furthermore, there were observed a reduction of 50% in the downgrading of eggs through breakage or malformation of the shell, and deeper coloration of the shell and yolk.

The trials the results of which have just been given were carried out by giving hens exactly the same weight of feed as was previously given according to one of the formula A or B.

Foodstuff formula C given throughout the trials was:
Compound of calcium phosphates resulting from the invention: 9.83
TVC: 1.00
Soya containing 48% protein: 19.86
Corn: 67.36
Wheat: 1.86
Methionine: 0.09

Figure 2:
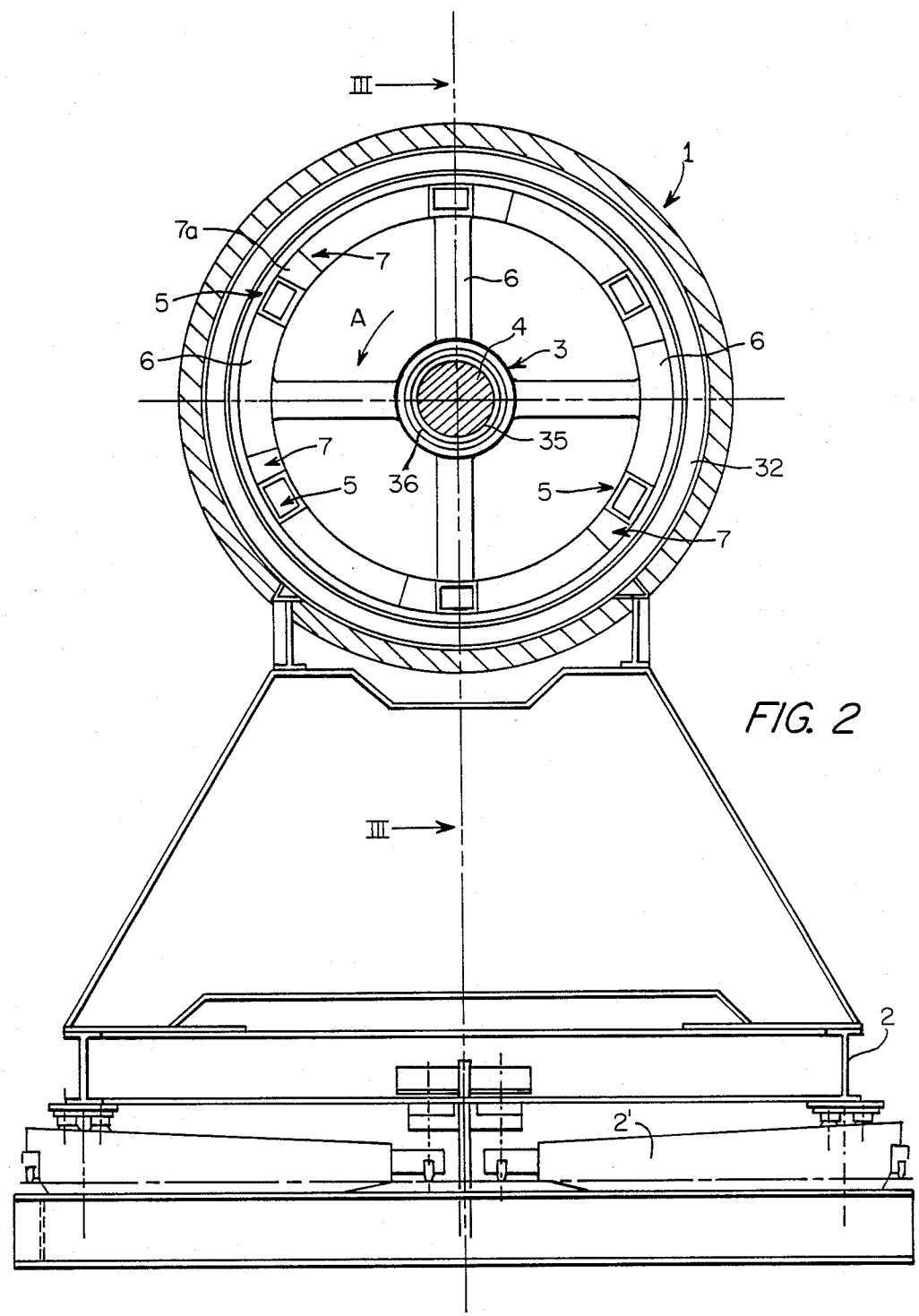
Figure 3:
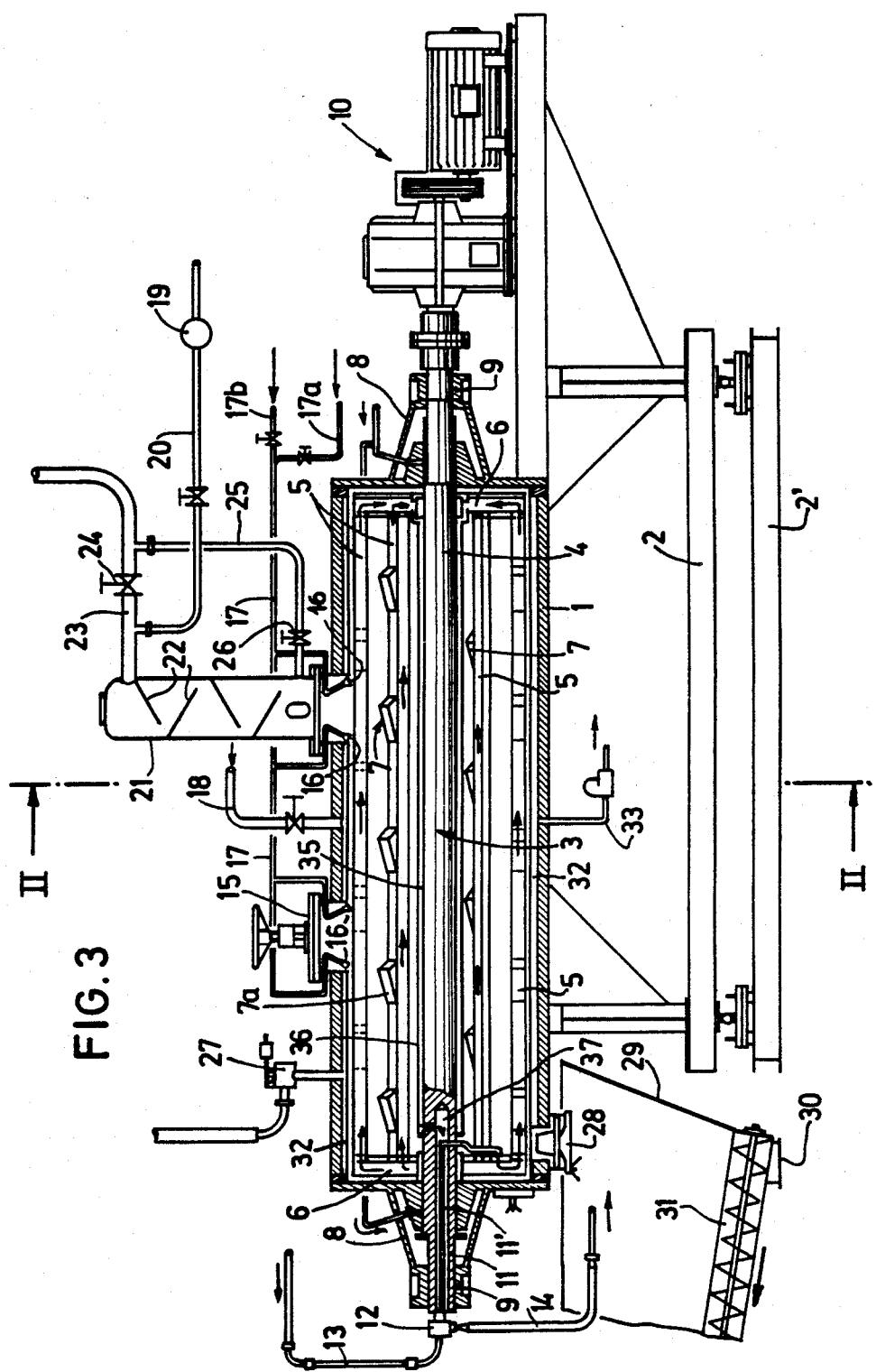

An installation for manufacturing the product by implementing the above process will now be described with reference to FIGS. 2 and 3. In these figures:

FIG. 2 is a transverse section of the installation according to line II—II of FIG. 3; and FIG. 3 is a longitudinal section according to line III—III of FIG. 2.

The installation shown incorporates a closed reactor 1, consisting of a horizontal cylinder with heat-insulated double jacket, carried on a base 2 which rests on a weighing device 2'. In the reactor 1, three rotates a rotor 3 which incorporates a central solid shaft 4 and longitudinal tubes 5 carried by radial end flanges or arms 6, and incorporating vanes for agitating and movement 7. The shaft 5 passes axially through the end walls 8 of the reactor 1, being supported by sealed bearings 9. The shaft 4 is driven in rotation at one end by a geared motor unit 10 situated besides the reactor and supported by the base 2. At its other end, the shaft 4 has an axial channel 11 which is connected on the outside ot a rotating joint 12 of the Johnson housing type fed live steam through a pipe 13, and which permits the injection of live steam into the rotor through a pipe 11' housed in the center of the channel 11, and which enables the steam to be sucked out of the rotor through the channel 11 (at the periphery of the pipe 11') for conveyance of the condensates and steam to a reinjection flask (not shown) through a pipe 14.

At its top, the reactor 1 incorporates a door 15 for loading with aggregates to be treated, after the latter have been crushed and screened, and nozzles 16 fed through a circuit 17 for projecting phosphoric acid (supplied through the pipe 17a) and optionally other liquids needed for the reaction (sea water, fresh water, and the like) supplied through the pipe 17b.

A main pipe 18 delivers the live steam for heating under pressure (for example, a pressure of 6 bars) at the center of the top of the reactor. This stream circulates in the annular space 32 present in the double wall of the reactor. It is collected in the form of condensate at the bottom through a return pipe 33 to the reinjection flask.

Evacuation of the gaseous products is effected by a vacuum pump 19, the evacuation pipe 20 of which terminates at the top of an expansion dome 21 which has baffles 22 and is mounted at the top of the reactor and communicates with the inside of the latter. The top of the dome receives the evacuation pipe 20 through a pipe 23 which opens to the atmosphere and which bears, beyond its point of junction with the pipe 20, a gate valve 24. A bypass pipe 25, with gate valves 26, permits direct communication between the bottom of the vessel 21 and the pipe 25 downstream of the gate valve 24.

The baffles 22 prevent solid particles (shell fragments) from being drawn towards the vacuum pump 19.

A safety valve 37, opening to the atmosphere and calibrated at a safety value, for example 6.5 bars, is usually provided for the space 32.

At one end, the reactor 1 bears a door 28 at the bottom for unloading the treated aggregates into a discharge hopper 29 which is carried by an auxiliary base 30 and from which they are removed by a transporter 31 for the purposes of storage or subsequent treatment.

Heating of the stator, consisting of the reactor 1, is provided by the live steam delivered through the pipe 18. Heating of the rotor 3 is provided by the live steam delivered through the pipe 13 and which is supplied, through the rotating joint 12 and the pipe 11', to a flange 10 or to the hollow arms 6 on one side of the rotor, to pass longitudinally in the peripheral tubes 5 connecting the inner spaces of the flanges or arms, return to the axis of the rotor through the other flange or arms 6, and be brought back axially to the rotating joint 12 by passing through the cylindrical annular space 35 provided between the solid shaft 4 and a coaxial tube 36, this space communicating at 37 with the channel 11.

Continuous heating of the reaction chamber is thereby provided for, on the one hand of its outer periphery, and on the other hand inside the treated mass itself, the live steam being maintained out of contact with this mass and being removed with its condensates.

According to a special feature, the vanes 7 are located behind their supporting tubes 5 from the standpoint of the direction of rotation A of the rotor during the reaction, so that they have practically no effect on moving the aggregates axially during the reaction, but simply the role of agitating. As shown in FIG. 2, these vanes have a main active surface 7a which slopes towards the associated tube 5 and towards the discharge end of the reactor. Thus, at the end of the reaction, when the direction of rotation of the rotor is reversed, the vanes 7 act as transporting means which move the treated aggregates according to a motion which has an axial component directed towards this discharge end. The vanes 7 participate in agitating the shell fragments in the phosphoric acid solution during the reaction, and they provide for removal of the aggregates at the end of the reaction.

This design makes it possible to prevent caking of the shell fragments during reaction with the phosphoric acid and permits good graulation after the reaction.

It should be noted that the reactor 1 is hermetically sealed at each of its openings 15 and 28 for introducing and removing material, and also at each of its supporting bearings 9.

This design has the main advantage of enabling, once the production of carbon dioxide and steam has finished (neutrality of the acid at the end of reaction), a vacuum build-up to be achieved by the means 19-20, and consequently of permitting:

the extraction under vacuum and in gaseous form of the harmful products resulting from the reaction between phosphoric acid and the shells and/or lithothamnioid algae (in particular, extraction of the hydrofluoric acid vapor always present in commercial phosphoric acid);

maximum utilization of the exothermal effect of the reaction between phosphoric acid and calcium carbonate;

economization in the amount of heat energy;

extraction under vacuum of the water particles included in calcareous tissues;

a dehydrated product to be obtained, which can be preserved for a long period.

The installation which has just been described obviously operates discontinuously. This installation has hence the further advantage of very great accuracy in respect of the amount of phosphoric acid to be introduced into the reactor when the weight of shells (or lithothamnioid algae) and the degree of moisture of these shells are known by the means 2'.

In this connection, it is essential that the shells and/or algae are strongly impregnated with sea water to ensure that, as the phosphoric acid is introduced into the reactor in operation, the acid is distributed rapidly and very uniformly over the entire surface of the fragments.

If, hypothetically, the moisture content (component sea water and surface sea water) of the aggregates and/or algae introduced does not reach the value of 12 to 18% which is desirable according to the subsequent application envisaged, addition of sea water or fresh water will be provided inside the reactor through the pipeline 17b before introducing the acid through the pipeline 17a.

Finally, it is recalled that, by the technique of implementation described above, the core of the aggregate (shell or algal fragment) has not undergone phosphoric acid attack in the chemical sense, and that it only undergoes the secondary physical effects (twisting resulting from the surface attack by the acid, temperature rise).

This type of controlled reaction makes still more obvious the value of using, according to the present invention, shell tissues which have an organo-inorganic nature, hence those of recent formation. In this connection, it is useful that the shells and algae drawn from the ocean depths should possess at least 4% of organic materials by weight, and if possible up to approximately 12% to 13% of organic materials by weight. From this standpoint, the Brittany coast is especially rich in shells and algae of this type.

It has been experimentally verified that the organic constitution of the aggregates collected along the Brittany coast fulfilled at least three objectives:

the gelatinous surfaces of the aggregates impose sufficient resistance to the penetration of phosphoric acid on the smooth faces, the presence of component proteins is only an initial indicator of the organic nature of the product; other organic components of low nitrogen content, such as pigments, pectins, nucleides, phosphonucleides, and magnesium-, iron- and silicon-containing amines have been monitored;

a feature of the organic aggregates is also the absence of reducing iron and the absence of cadmium, which are, in contrast, especially abundant in fossilized shells.

The invention is naturally not limited either to the modes of application or the embodiment described, and diverse variants could be envisaged without in any way departing from its scope. The same applies, in particular, to any foodstuff composition for animals and soils, one of the constituents of which was the nutritional product defined above in respect of both its constitution and its preparation.

The shells and lithothamnioid algae could also be supplemented by various silicates of natural origin derived from rocks and minerals and incorporated by subjecting them to the action of phosphoric acid.

We claim:

1. A nutritional product for breeding animals and for soils, characterized in that it consists of aggregates of organic sea limestones of recent formation, part of which takes the form of at least one of the mono-, bi- and tricalcium phosphate, said at least one phosphate resulting from the action of phosphoric acid on the said organic sea limestones of recent formation, the said product containing a maximum of 20% of phosphorus by weight.

2. A nutritional product as claimed in claim 1 wherein the organic sea limestones of recent formation are selected from shells and lithothamnioid algae.

3. A nutritional product as claimed in claim 2 wherein said shells are shells of oysters.

4. A nutritional product as claimed in claim 2 for the nutrition of laying hens, characterized that it contains from 1 to 3 weight percent phosphorus.

5. A nutritional product as claimed in claim 4 characterized that it contains about 2.6 weight percent of phosphorus.

6. A nutritional product as claimed in claim 2 for the nutrition of livestock, characterized in that it contains from 3 to 10% of phosphorus by weight.

7. A nutritional product as claimed in claim 6 for the nutrition of cattle, characterized in that it contains approximately 7% of phosphorus by weight.

8. A nutritional product as claimed in claim 6 for the nutrition of pigs, characterized in that it contains about 9% by weight of phosphorus.

9. A nutritional product as claimed in claim 2 for soil nutrition, characterized in that it contains about 5 to 10% by weight of phosphorus.

10. A nutritional product as claimed in claim 2 for animal nutrition, characterized in that it has a degree of moisture, achieved at least in substantial part by using sea water, of approximately 3% by weight.

11. A nutritional product as claimed in claim 2 for soil nutrition, characterized in that it has a degree of moisture, achieved at least in substantial part by using sea water, of approximately 7% by weight.

12. A nutritional product as claimed in claim 2 for animal nutrition, characterized in that it has a particle size between 2 mm and 4 mm.

13. A nutritional product as claimed in claim 2 for soil nutrition, characterized in that it has a particle size between 0.5 mm and 3 mm.

14. A nutritional product as claimed in claim 2 characterized in that the aggregates possess a core of organo-inorganic material unaffected by the action of phosphoric acid and, at the surface, microcracking and/or twisted fringes or loops resulting from the physico-chemical action of the said acid.

15. A nutritional product as claimed in claim 2 characterized in that it has a lower content of tricalcium phosphate than of monocalcium phosphate and of bicalcium phosphate.

16. A nutritional product as claimed in claim 15 characterized in that it comprises a mixture of approximately 50% of bicalcium phosphate, 35% of monocalcium phosphate and 10% of tricalcium phosphate.

17. A process for manufacturing a nutritional product for breeding animals of for soils the nutritional product consisting of aggregates of organic sea limestones of recent formation, part of which takes the form of at least one of the mono-, bi-, and tricalcium phosphates, said at least one phosphate resulting from the action of phosphoric acid on the said organic sea limestones of recent formation, the product containing a maximum of 20% of phosphorus by weight, said process being characterized in that it comprises chemically reacting phosphoric acid with the aggregates of organic sea limestones of recent formation in the presence of water, at least part of which is sea water, and, in partially attacking the aggregates by the said phosphoric acid, forming at least one of the mono-, bi-, and tricalcium phosphates around a shell core, and finally extracting under reduced pressure the noxious gaseous products resulting from this reaction to thereby recover the nutritional product.

18. A process as claimed in claim 17 wherein the weight of water represents approximately between 12 and 18% of the weight of the organic sea limestone to be treated.

19. A process as claimed in claim 18 wherein the reaction is carried out at a temperature of 30° C. to 100° C.

20. A process as claimed in claim 19 wherein the treated aggregates are dried to a moisture content of not more than about 7% by weight.

21. A process as claimed in claim 17 wherein the process is controlled to limit the chemical action of the acid to the surfaces of at least a substantial amount of said aggregates so as to leave the central cores intact, retaining their original properties and constituents.

* * * * *

UNITED STATES PATENT AND TRADEMARK OFFICE
CERTIFICATE OF CORRECTION

PATENT NO. : 4,851,242

DATED : July 25, 1989

INVENTOR(S) : Pierre G. Dubois; Francois M. Lognone; Francois J. Pape

It is certified that error appears in the above—identified patent and that said Letters Patent is hereby corrected as shown below:

On the first page of the printed patent, the information page, between items [63] and [51], the following is added:

[30]     Foreign Application Priority Data

Jun. 10, 1983 [FR]   France ................. 83.09779

Signed and Sealed this

Fifteenth Day of January, 1991

Attest:

HARRY F. MANBECK, JR.

*Attesting Officer*     *Commissioner of Patents and Trademarks*